United States Patent [19]

Kaussen et al.

[11] Patent Number: 4,813,968
[45] Date of Patent: Mar. 21, 1989

[54] RETANNING PROCESS

[75] Inventors: Manfred Kaussen; Dolf Stockhausen, both of Krefeld; Hans-Georg Hartan, Kevelaer; Alfons Landscheidt, Krefeld, all of Fed. Rep. of Germany

[73] Assignee: Chemische Fabrik Stockhausen GmbH, Krefeld, Fed. Rep. of Germany

[21] Appl. No.: 145,941

[22] Filed: Jan. 20, 1988

[30] Foreign Application Priority Data

Jan. 26, 1987 [DE] Fed. Rep. of Germany ....... 3702153

[51] Int. Cl.$^4$ ................................................ C14C 5/00
[52] U.S. Cl. ...................................... 8/94.23; 8/94.33; 8/94.19 R
[58] Field of Search ............................ 8/94.23, 94.33; 526/307

[56] References Cited

U.S. PATENT DOCUMENTS 2,879,255   3/1959   Coover, Jr. ...................... 526/307

Primary Examiner—Prince E. Willis
Assistant Examiner—John F. McNally
Attorney, Agent, or Firm—Sprung Horn Kramer & Woods

[57] ABSTRACT

The present invention relates to a process to improve the organoleptic behaviour and the physical characteristics of leather by the use of aqueous solutions of copolymers of 90 to 20%-wt acrylic acid or methyacrylic acid, as well as 10 to 80%-wt of a monomer of the formula

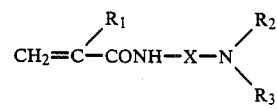

wherein $R_1$ is hydrogen or methyl; $R_2$ and $R_3$, which are equal or different, are methyl or ethyl; x stands for an optionally branched alkylene radical with 1 to 5 carbon atoms; the amine nitrogen is optionally neutralized or quaternized; and the molecular weight of the copolymer, measured at a pH of 8.0, is less than 100,000. The concentration of the copolymer in the aqueous solution is 0.02 to 10%-wt, relative to the shaved weight of the leather.

9 Claims, No Drawings

RETANNING PROCESS

The present invention relates to a process for retanning, by means of which, in particular, the surface characteristics of the leather, such as its smoothness and lustre, as well as its physical properties, such as elasticity, and dyeing properties, are improved.

The development of specific types of leather is governed by the expectations of the fashion industry and the demand for appropriate functional properties. The factors that determine fashionable appearance are the visual impact of the surface and the character of the leather, which are referred to as its organoleptic characteristics. In contrast to this, its properties or utility are determined mainly by the physical behaviour of the particular leather.

Efforts being made to arrive at a leather end-product that is of an overall enhanced value are being hindered, in particular, by the world-wide degeneration in the quality of the raw material. This means that leathers with a greater degree of loose graining are being produced, and that more powerful dressings are being used in order to cover up the unfavourable appearance. However, a strong, thick dressing conceals the highly-valued and attractive original appearance of the leather. For this reason, processes that make it possible to enhance the appearance of the surface of the leather and improve its organoleptic behaviour without using larger quantities of pigment, for example, are of particular interest.

In the context of leather processing, retanning represents the step that offers the most with regard to achieving this objective and/or affecting the desired trend, as long as it is not understood in its original sense, which is to increase the shrinkage temperature of the leather. Syntans, the water-soluble condensation products of aromatic sulfonic acids and formaldehyde, or water-soluble polymers based on acrylic acid and other unsaturated polymerisable carboxylic acids, are typical substances used for retanning. However, the anionic character leads to a more or less pronounced lightening of colour, and this is undesirable. This disadvantage can be lessened in that aromatic amines are used in the syntans, or if polyampholytic resins are used.

DE-OS No. 21 27 959 describes polyampholytic resins with a carboxyl to amino group ratio that ranges from 97.5:2.5 to 35:45, which are used in order to improve the colour characteristics and the elongation at break of the leather. The amino groups are part of basic esters, in particular from dimethylaminoethylmethacrylate, used as a comonomer. However, such basic esters entail the disadvantage that they are sensitive to hydrolysis.

EP 0084134 describes terpolymers that are based on acrylic acid or methacrylic acid, N-(3-dimethylaminopropyl) methacrylamide and acrylonitrile and/or acrylamide and used as retanning substances. This, too, is said to result in improved dyeing properties and good fullness.

For these reasons, it is the task of the present invention to describe auxiliary agents for leather, these improving not only the colour behaviour but, in the first instance, its organoleptic behaviour (appearance of the surface, in particular with regard to lustre and smoothness) and its physical properties.

According to the present invention, this task has been solved by the characteristic features as set out in patent claim 1.

Most surprisingly, it has been shown that properties such as lustre, smoothness, levelness, flexural and elastic behaviour, as well as fineness of the grain on the surface, can all be achieved by using copolymers from basic acrylamide derivatives and acrylic acid or methacrylic acid. Especially advantageous is the fact that if the copolymers according to the present invention are used, it is possible to dispense with the acrylonitrile, which is hazardous because of its toxicity.

The copolymers used according to the present invention are amphoteric, water-soluble products that, in addition to acrylic acid or methacrylic acid, contain a basic acrylamide monomer b) that is polymerized therewith.

It is preferred that the copolymers that are used according to the present invention have a molecular weight of 500 to 50,000. The molecular weight is determined by gel permeation chromatography.

The copolymers used according to the present invention are used in the form of their aqueous solutions. Preferred are the copolymers that occur in the form of their aqueous solutions, the copolymer concentration of which (regardless of active substance) is between 20 and 50%-wt as a result of production constraints, diluted to the concentration required for use. The copolymers used according to the present invention are effective even at very low concentrations. Suitable concentrations can be determined very simply, depending on the type of leather involved and the properties that are desired. The concentration of the aqueous copolymer solution can vary within a very wide range (0.02 to 10%-wt copolymer) relative to the shaved weight of the leather. Concentrations from 0.1 to 7.5% are preferred, with concentrations of 0.4 to 5%-wt being sufficient to achieve good leather characteristics for most practical purposes.

The composition of the copolymers can vary within the ranges set out in claim 1, although copolymers with 80 to 40%- wt acrylic acid or methacrylic acid and 20 to 60%-wt basic acrylamide monomers b) have proved to be particularly suitable.

N-alkylsubstituted acrylamides or methacrylamides that have a tertiary amino group on the alkly radical are preferred as monomer (b). Examples of these are dimethylaminopropyl acrylamide, dimethylaminopropyl methacrylamide, dimethylamino-2,2-dimethylpropyl acrylamide, dimethylamino-2,2-dimethylpropyl methacrylamide, and diethylaminopropyl acrylamide.

The amino nitrogen in comonomer b) is optionally neutralised or quaternised.

The leather-improving agents can be obtained by polymerisation methods known per se.

Polymerisation of the monomers is preferably carried out in aqueous solution or in mixtures of water and alcohol, e.g., isopropanol. Initiation of polymerisation takes place with the help of free radical polymerisation catalysts. Redox systems and/or thermally decomposing free radical initiators of the type of azo compounds such as azoisobutyronitrile, for example, can be used. Examples of suitable redox systems are combinations of hydrogen peroxide, salts of peroxydisulphuric acid or tertiary butylhydroperoxide with sodium sulfite or sodium dithionite as reducing components.

In order to achieve molecular weights of less than 100,000 according to the present invention, it is expedient to carry out the polymerisation in the presence of polymerisation regulators. These can be lower alcohols with 1 to 4 carbon atoms, preferably isopropanol. Also effective as regulators are hydroxyl ammonium salts, as well as mercaptans, for example, mercaptoethanol or thioglycolic acid.

Copolymerisation can be so carried out by taking a part of the monomer mixture, initiating the copolymerisation, and then metering in the monomer mixture at a steady rate. The temperature can vary throughout a wide range during copolymerisation. Depending on the catalysts used, the temperatures can be optimum between 50° C. and 200° C.. It is possible to carry out the polymerisation at the boiling point of the solvent or at temperatures above this under pressure.

Frequently, it may be advantageous to carry out polymerisation under adiabatic conditions. In this case, the start of polymerisation takes place most expediently at low temperatures, e.g., 20° C. The end temperature that is reached as a result of the heat liberated by the polymerisation process depends on the monomers used and concentration conditions, and can reach 180° C. at a suitable pressure.

The pH value can vary throughout a very wide range during copolymerisation. It is advantageous that copolymerisation take place at lower pH values, although pH values that are above the neutral point are also possible.

After polymerisation, the pH is adjusted to a range of 5 to 12, preferably 7 to 8 by using an aqueous base, for example, caustic soda, ammonia or caustic potash.

The production of the copolymers used according to the present invention, and application of said copolymers to leather, are explained in the examples that follow; the parts referred to are percentage parts.

EXAMPLE 1

Production of the Copolymer

Copolymer 1:
62 parts dimethylaminopropylacrylamide are introduced into a mixture of 675 parts water, 38 parts 37-% hydrochloric acid and 225 parts acrylic acid during stirring and cooling. A pH of 1.6 results. The temperature is 20° C. Next, 42 parts 35-% hydrogen peroxide, 36 parts mercaptoethanol and 2 parts 1-% iron (II)-sulfate solution are stirred into the monomer solution one after the other, and the stirrer is then stopped. Polymerisation, which begins immediately, is indicated by an increase in temperature. The end temperature of 95° C. is reached after approximately 2 minutes. 4.5 parts 35-% hydrogen peroxide and 2 parts 40-% aqueous hydroxylaminohydrochloride solution are then stirred in. This is allowed to react for one hour, and a pH of 8.0 is obtained by the addition of 269 parts 45-% caustic soda.

The viscosity of the product is 30 mPa.s. Determination of molecular weight by gel permeation chromatography (GPC) indicates a value of 920. The product contains 27.3% active substance.

Use in Leather Processing

The solution obtained as set out above is used as described below:
Small-animal skins:
Type: Sheep nappa; wet blue, New Zealand; %-data based on sammied weight
Wash
300% water: 35° C.
0.2% formic acid (1:5, diluted with water)
1% degreasing agent based on non-ionic emulsifiers and chlorinated hydrocarbons 30 mins
Drain off bath
Rinse Water 40° C. 5 mins
Retanning
150% water: 40° C. 5% mineral tanning substance with approximately 13% $Cr_2O_3$ content, undissolved 45 mins
2% colour-fast anionic neutralising tanning substance, undissolved 45 mins
pH 4.0
Drain off bath
Rinse Water 40° C. 5 mins
Neutralisation/Retanning
150% water: 40° C.

2% colour-fast anionic neutralising tanning substance, undissolved 30 mins
pH 5.4
Leather cross-section with bromocresol green:green-blue
3% replacement syntan, undissolved
3% anionic resin tanning substance
6.7% copolymers according to the present invention, as in example 1; 1:3; 45 mins
0.7% formic acid; 1:5; 45 mins
pH 3.7-4.0
Drain off bath
Rinse Water 50° C. 5 mins
Dyeing/Fatting
150% water: 50° C.
0.8% ammonia; 1:5; 10 mins
+2% slightly acidic dyeing auxiliary undissolved: 10 mins
+4% Baygenalbraun CN (Bayer Ag, Leverkusen) undissolved: 30 mins
Leather cross-section dyed through
+4% fatting agent based on sulfonated natural and synthetic fatting agents;

1:4; 45 mins +
4% synthetic fatting agent
+1.5% formic acid; 1:5
2×after 5 minutes and once after 30 minutes
pH 3.4
Drain off bath
Rinse: Water: 20° C.: 10 mins
Horse up overnight
Sammy
Set out
Hang dry
Dampen
Stake
Dry shave
Mill
Toggle The nappa leather treated with the copolymer according to the present invention displays a clear, distinctive lustre and a has a smooth surface with a level, fine grain. The double-skinning was suppressed. The elastic behaviour was very marked.

EXAMPLE 2

Copolymer 2:

Production of the Copolymer 72 parts dimethylaminopropylacrylamide are introduced into a mixture of 621 parts water, 45 parts 37-% hydrochloric acid and 263 parts acrylic acid during cooling. A pH of 1.6 results. The temperature is 20° C. Next, 3 parts 35-% hydrogen peroxide, 1 part mercaptoethanol and 0.5 parts 1-% iron (II)-sulfate solution are stirred into the monomer solution one after the other, and the stirrer is then stopped. Polymerisation, which begins immediately, is indicated by an increase in temperature. The end temperature of 95° C. is reached after approximately 8 minutes. 4.5 parts 35-% hydrogen peroxide and 2 parts 40-% aqueous hydroxylaminohydrochloride solution are then stirred in. This is allowed to react for one hour, and a pH of 8.0 is obtained by the addition of 309 parts 45-% caustic soda.

The viscosity of the product is 9500 mPa.s. Determination of molecular weight indicates a value of 4400. The product contains 32.7% active substance.

Use in Leather Processing

The copolymer obtained as described above is used in the following manner in order to check its efficacy from the standpoint of its application in leather processing:
Cattle hides:
Type: Retanned upper leather; wet blue, shaved substance 2.0 mm, Ts: 100° C.; %-data based on shaved weight
Wash
300% water: 35° C.
0.3% formic acid; 1:5; 15 min
pH 3.7
Drain off bath: 30 mins
Neutralisation/Retanning
100% water: 35° C.
1% sodium formate
2% neutralisation and retanning substance undissolved: 45 mins
pH 5.7
Leather cross-section against bromocresol green: blue
4% copolymer according to the present invention; 1:3; 45 mins
Drain off bath
Wash
300% water: 50° C.; 10 mins
Drain off bath
Dyeing/Fatting
100% water: 50° C.
1% Baygenalbraun L-N5G (Bayer AG, Leverkusen); 1:20; 20 mins
+6% fatting agent based on sulfonated natural and synthetic fatting substances; 1:4; 45 mins
+2% synthetic fatting agent
+1% formic acid; 1:5; 20 mins
pH 3.8
Drain off bath
Rinse Water 20° C.: 5 mins
Horse up overnight
Sammy
Set out
Vacuum dry (80° C./2.5 mins)
Air off
Condition
Stake
Iron (80° C./0.5 mins)

The leather treated with the copolymer according to the present invention is distinguished by its characteristic lustre, smoothness, fine grain, and its elastic behaviour.

EXAMPLE 3

115 parts dimethylaminopropyl methacrylamide are introduced into a mixture of 603 parts water, 72 parts 37-% hydrochloric acid and 210 parts acrylic acid during cooling. A pH of 1.6 results. The temperature is 20° C.. Next, 19 parts 35-% hydrogen peroxide, 5 parts mercaptoethanol and 0.5 parts 1-% iron (II)-sulfate solution are stirred into the monomer solution one after the other, and the stirrer is then stopped.

Polymerisation, which begins immediately, is indicated by an increase in temperature. The end temperature of 95° C. is reached after approximately 4 minutes. 4.5 parts 35-% hydrogen peroxide and 2 parts aqueous 40% hydroxylaminohydrochloride solution are then stirred in. This is allowed to react for one hour, and a pH of 8.0 is obtained by the addition of 255 parts 45-% caustic soda. The viscosity of the product is 180 mPa.s. Determination of molecular weight indicated a value of 6300. The product contains 32.4% active substance.

Use of the copolymer as in Example 3, as described in Example 1, results in a leather with a high degree of elongation elasticity, and a slight amount of loose graining. The surface has a silky character, and the colouration is very deep.

EXAMPLE 4

144 parts dimethylamino-2,2-dimethylpropyl acrylamide are introduced into a mixture of 592 parts water, 90 parts 37-% hydrochloric acid and 175 parts acrylic acid during cooling. A pH of 1.6 results. The temperature is 20° C.. Next, 28 parts 35-% hydrogen peroxide, 24 parts mercaptoethanol and 1 part 1-% iron (II)-sulfate solution are stirred into the monomer solution one after the other, and the stirrer is then stopped. Polymerisation, which begins immediately, is indicated by an increase in temperature. The end temperature of 95° C. is reached after approximately 2 minutes. 4.5 parts 35-% hydrogen peroxide and 2 parts 40-% aqueous hydroxylaminohydrochloride solution are then stirred in. This is allowed to react for one hour, and a pH of 8.0 is obtained by the addition of 216 parts 45-% caustic soda. The viscosity of the product is 39 mPa.s. Determination of molecular weight indicated a value of 1800. The product contains 31.4% active substance.

The copolymer so obtained, used as described in Example 1, results in a leather with a high degree of lustre, pleasing smoothness, and distinctive elastic behaviour.

EXAMPLE 5

173 parts dimethylaminopropyl acrylamide are introduced into a mixture of 580 parts water, 107 parts 37-% hydrochloric acid and 140 parts methacrylic acid during cooling. A pH of 1.6 results. The temperature is 20° C. Next, 28 parts 35-% hydrogen peroxide, 24 parts mercaptoethanol and 1 part 1-% iron (II)-sulfate solution are stirred into the monomer solution one after the other, and the stirrer is then stopped. Polymerisation, which begins immediately, is indicated by an increase in temperature. The end temperature of 95° C. is reached after approximately 2 minutes. 4.5 parts 35-% hydrogen peroxide and 2 parts 40-% aqueous hydroxylaminohydrochloride solution are then stirred in. This is allowed to react for one hour, and a pH of 8.0 is obtained by the addition of 174 parts 45-% caustic soda. The viscosity of the product is 105 mPa.s. Determination of molecular weight indicates a value of 3900. The product contains 31.6% active substance.

Used as in Example 2, the copolymer results in a leather with a smooth surface, a silky lustre, and a level, fine grain. The leather displays distinctive elasticity and recovery.

EXAMPLE 6

592 parts water, 263 parts acrylic acid, and 87.5 parts dimethylaminopropyl acrylamide, quaternized with methylchloride, are mixed. This results in a pH of 2.1. The temperature is 20° C. Nitrogen is now introduced into the reaction mixture and 11 parts 35-% hydrogen peroxide, 2.5 parts mercaptoethanol, and 0.5 parts 1-% iron-(II)-sulfate solution are stirred in one after another. The stirrer is then stopped. Polymerisation, which begins immediately, is revealed by an increase in temperature. The end temperature of 92° C. is reached after approximately 8 minutes. Next, 4.5 parts 35-% hydrogen peroxide and 2 parts 40-% aqueous hydroxylaminohydrochloride solution are stirred in. This is allowed to react for one hour and a pH value of 8.0 is obtained by the addition of 295 parts 45-% caustic soda. The viscosity of the product is 360 mPa.s. Determination of the molecular weight results in a value of 2100.

The leather treated with this copolymer as in Example 1 is distinguished by good lustre and smoothness. Double skinning is greatly reduced. The leather was characterized by distinctive round handle.

We claim:

1. A process for retanning leather by treatment with an aqueous solution of a copolymer at a float length of 30 to 300% relative to shaved weight, pH values in the range from 3 to 6, and temperatures in the range from 20 to 70° C., characterized in that one uses a copolymer of
   (a) 90 to 20%-wt acrylic acid or methacrylic acid and
   (b) 10 to 80%-wt of a compound of the formula

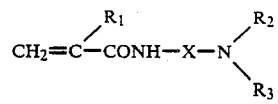

wherein $R_1$ is hydrogen or methyl; $R_2$ and $R_3$, which are equal or different, are methyl or ethyl; x is a branched alkylene radical with 1 to 5 carbon atoms; the amine nitrogen is optionally neutralized or quaternized; and the molecular weight of the copolymer, measured at a pH of 8.0, is less than 100,000.

2. A process as defined in claim 1, characterized in that one uses copolymers with a molecular weight of 500 to 50,000.

3. A process as defined in claim 1, characterized in that one uses copolymers of
   (a) 80 to 40%-wt acrylic acid or methacrylic acid, and
   (b) 20 to 60%-wt comonomer (b).

4. A process as defined in claim 1, characterized in that one uses copolymers that contain dimethylaminopropyl acrylamide or dimethylaminopropyl methacrylamide that is copolymerized as monomer (b).

5. A process as defined in claim 1, characterized in that one uses copolymers that contain dimethylamino-2,2- dimethylpropyl acrylamide or dimethylamino-2,2-dimethylpropyl methylacrylamide that is copolymerized as monomer (b).

6. A process as defined in claim 1, characterized in that the copolymer is used in a concentration of the aqueous solution of 0.02 to 10%-wt relative to the shaved weight of the leather.

7. A process as defined in claim 1, characterized in that the copolymer is used in a concentration of 0.1 to 7.5%-wt relative to the shaved weight of the leather.

8. A process as defined in claim 1, characterized in that the copolymer is used in a concentration of 0.4 to 5%-wt, relative to the shaved weight of the leather.

9. Retanned leather, obtained as set out in claim 1.

* * * * *